Reissued Nov. 25, 1924.

Re. 15,952

UNITED STATES PATENT OFFICE.

HAROLD S. ASHENHURST, OF CHICAGO, ILLINOIS, ASSIGNOR TO HERBERT A. PARKYN, OF CHICAGO, ILLINOIS.

INSULATING SUBSTANCE.

No Drawing. Original No. 1,402,133, dated January 3, 1922, Serial No. 382,903, filed May 20, 1920. Reissue No. 15,844, dated May 27, 1924, Serial No. 683,257, filed December 28, 1923. This application for reissue filed July 18, 1924. Serial No. 726,893.

*To all whom it may concern:*

Be it known that I, HAROLD S. ASHENHURST, a citizen of the United States, and resident of Chicago, in the county of Cook and State of Illinois, have invented a certain new and useful Improvement in an Insulating Substance, of which the following is a specification.

My invention relates to heat insulating materials and particularly to a novel improvement in the composition of matter described in my prior Patent No. 1,230,085.

In that patent I disclosed a composition of matter the major constituent of which was asbestos in comminuted form and suggested the possibility of employing other refractory materials including calcium sulphate or gypsum. However, long experiments failed to demonstrate any practical value in this suggestion inasmuch as an insulating material of sufficient lightness could not be produced by employing calcium sulphate as disclosed in that patent. While the reactions were prompt and vigorous and the material became exceedingly porous in character, it would not remain in that condition but immediately "fell". In other words, while the mass seemed to "rise" in a most satisfactory manner and gave promise of the production of a solid body of extreme lightness, it invariably "fell" and in its final form was much too heavy to be of practical use.

I have discovered a means of obviating this tendency and am able to produce an insulating material of extreme lightness; that is, one in which the cellular structure is most pronounced and which is stable in form. The result is secured by adding a small quantity of a so-called "retarder" to the gypsum as the principal constituent to which is added chemicals similar to those proposed in my prior patent heretofore referred to. I am able to produce a substance as light as 12 pounds per cubic foot having a specific gravity as low as 0.19. This, as will readily be understood, is of enormous advantage not only because of the relatively high insulating capacity but because of the economy in the use of gypsum as the major constituent.

Preferably also I mix with the materials a small quantity of fibrous material such as long fiber asbestos, or in the event the material is to be used where high heat is not to be resisted, cocoa or similar organic fibers. These fibers serve as reinforcements and strengthen the body of the material without adding to the weight thereof.

In practice a satisfactory result may be secured by combining approximately 4 pounds of a suitable retarder with each ton of gypsum. This is a commercial product and is so furnished when desired by the concerns which market the material.

In making up the compound herein described I prefer to employ approximately 20 parts by volume of the so-described gypsum, 2 parts by volume of magnesium carbonate and 2 parts by volume of aluminum sulphate. The carbonate employed, whether it be that specified or some of the other carbonates, is insoluble in water, but the aluminum sulphate, in commercial form, is soluble. Its reaction with water results in releasing a free acid—in this case sulphuric acid—which in turn reacts with the carbonate, releasing carbon dioxide. Where a reinforcing element is to be employed I may add long fiber asbestos or cocoa fiber in the proportion of approximately 5% by weight of the mass. This compound in its dry state is inert. However, when it is to be utilized a quantity of water is added thereto sufficient to make a thick paste whereupon the leavening action begins and the mass expands or "rises", the final volume being many times that of the mixture as formed. While stability of form is secured within a short time, the final hardening is not complete for 24 hours.

Whether the permanency of the cellular structure is wholly attributable to the slowing up of the process of setting or whether this is merely incidental to the colloidal effect which follows the use of the particular retarder, I am not aware. I wish it to be understood, therefore, that the word "retarder" is used as a broad term and that I intend to include within the scope of the term, as used in the claims, such other substances as will have the effect of preventing the escape of the gas, and the consequent collapse of the cellular structure, prior to hydraulic setting of the mass.

By the word "gypsum" as used in the specification and claims I refer to calcium sulphate which has been partially calcined and will hydraulically set.

Obviously the exact proportions specified are not essential and neither is it necessary to employ all of the chemicals specified in order to secure a desirable result.

I claim:

1. A new composition of matter composed of the reaction products of gypsum, a retarding chemical, aluminum sulphate, magnesium carbonate and water.

2. A new composition of matter composed of the reaction products of gypsum as the major ingredient, a retarder, a plurality of substances which when combined with water evolve a gas and produce a cellular structure, and approximately 5% by weight of fiber asbestos.

3. A cellular substance formed by the liberation of gas due to chemical reactions within a mass of hydraulically setting material, said substance being composed of the reaction products of calcium sulphate as the major ingredient, a water-insoluble carbonate, a substance having in water solution an acid reaction with the carbonate, whereby carbon dioxide is released, a retarder, and water.

4. A new composition of matter having a pronounced cellular structure and composed of the reaction products of a finely divided material which will hydraulically set as the major ingredient, a water-insoluble carbonate, a substance having in water-solution an acid reaction with the carbonate whereby carbon dioxide is released, a retarder, and water.

5. A new composition of matter having a pronounced cellular structure and composed of the reaction products of a finely divided material, which will hydraulically set, as its major ingredient, an insoluble carbonate, a retarder, and a solid which upon the addition of water will release an acid which will in turn act on the carbonate to release carbon dioxide, said finely divided material being inert relative to the gas-forming substances.

6. A new composition of matter having a pronounced cellular structure and composed of the reaction products of a finely divided material, which will hydraulically set, as its major ingredient, an insoluble carbonate, a retarder, aluminum sulphate, and water.

7. A new composition of matter having a pronounced cellular structure, the structure having been formed by adding water to a mixture composed of calcium sulphate as the major ingredient, an insoluble carbonate, a retarder, and a solid which on the addition of water releases an acid which will in turn act on the carbonate to release carbon dioxide.

8. A new composition of matter having a pronounced cellular structure and composed of the reaction products of calcium sulphate, an insoluble carbonate, a retarder, and a solid which upon the addition of water will release an acid which will in turn react with the carbonate to release carbon dioxide.

9. The herein described composition of matter having a cellular formation and composed of the reaction products of calcium sulphate as the major ingredient, aluminum sulphate, a solid which on the addition of water releases an acid, an insoluble carbonate, a retarder, and water.

10. A new composition of matter having a pronounced cellular structure and composed of the reaction products of calcium sulphate, a retarder, water, and a plurality of substances which in the presence of water evolve a gas, said substances remaining chemically inert relative to said calcium sulphate.

11. A dry mixture composed of a finely divided material which will hydraulically set, an insoluble carbonate, a retarder and a water-soluble solid which, in the presence of water will release an acid, which acid will react with the carbonate to release the carbon dioxide, the described substances reacting in the presence of water to produce a cellular structure, said finely divided material being inert relative to the gas-forming chemicals.

12. A dry mixture composed of a finely divided material which will hydraulically set, an insoluble carbonate, a retarder and aluminum sulphate, which substances react in the presence of water to produce a cellular structure.

13. A dry mixture composed of calcium sulphate, an insoluble carbonate, a retarder, and a water-soluble solid which, in the presence of water, will release an acid, which acid will react with the carbonate to produce carbon dioxide, the described substances reacting in the presence of water to produce a cellular structure and to hydraulically set in that condition.

14. A dry mixture of calcium sulphate, an insoluble carbonate, a retarder, and aluminum sulphate, which substances on the addition of water react to produce a cellular structure and to hydraulically set in that condition.

15. A dry mixture composed of calcium sulphate, a retarder, and a plurality of substances which in the presence of water evolve a gas, said substances in dry condition and in the presence of water being chemically inert relative to said calcium sulphate.

16. A new composition of matter comprising calcium sulphate, a retarder and a plurality of substances which when mixed with water evolve a gas and form a cellular structure, said substances in the presence of water remaining chemically inert relative to said calcium sulphate.

Signed at Chicago, Illinois, this 7th day of July, 1924.

HAROLD S. ASHENHURST.